United States Patent

[11] 3,596,248

[72] Inventor William A. Kolb
       Forest Hills, Pa.
[21] Appl No 882,541
[22] Filed Dec. 5, 1969
[45] Patented July 27, 1971
[73] Assignee United States Steel Corporation

[54] APPARATUS FOR COMPARING THE RELATIVE MAGNITUDE OF ELECTRICAL SIGNALS
6 Claims, 1 Drawing Fig.
[52] U.S. Cl. ................................................. 340/149, 340/172
[51] Int. Cl. ............................................... H04q 3/00
[50] Field of Search ..................................... 340/149, 172

[56] References Cited
UNITED STATES PATENTS
3,266,017  8/1966  Danielsen .................... 340/149

Primary Examiner—Harold I. Pitts
Attorney—Rea C. Helm

ABSTRACT: A group of electrical signals, whose relative magnitude is to be determined, are connected to pairs of comparators in all possible combinations of pairs of signals. Gating circuits connected to each pair of comparators provide an output indicating the one of three possible relations which exist between each pair of signals. The outputs from each gating circuit are interconnected to a series of gates, one for each possible combination, to provide a single output showing the specific relation between all the signals. Storage elements prolong the output for short duration signals. Circuitry periodically selects one set of signals to compare in rapidly changing sets of signals.

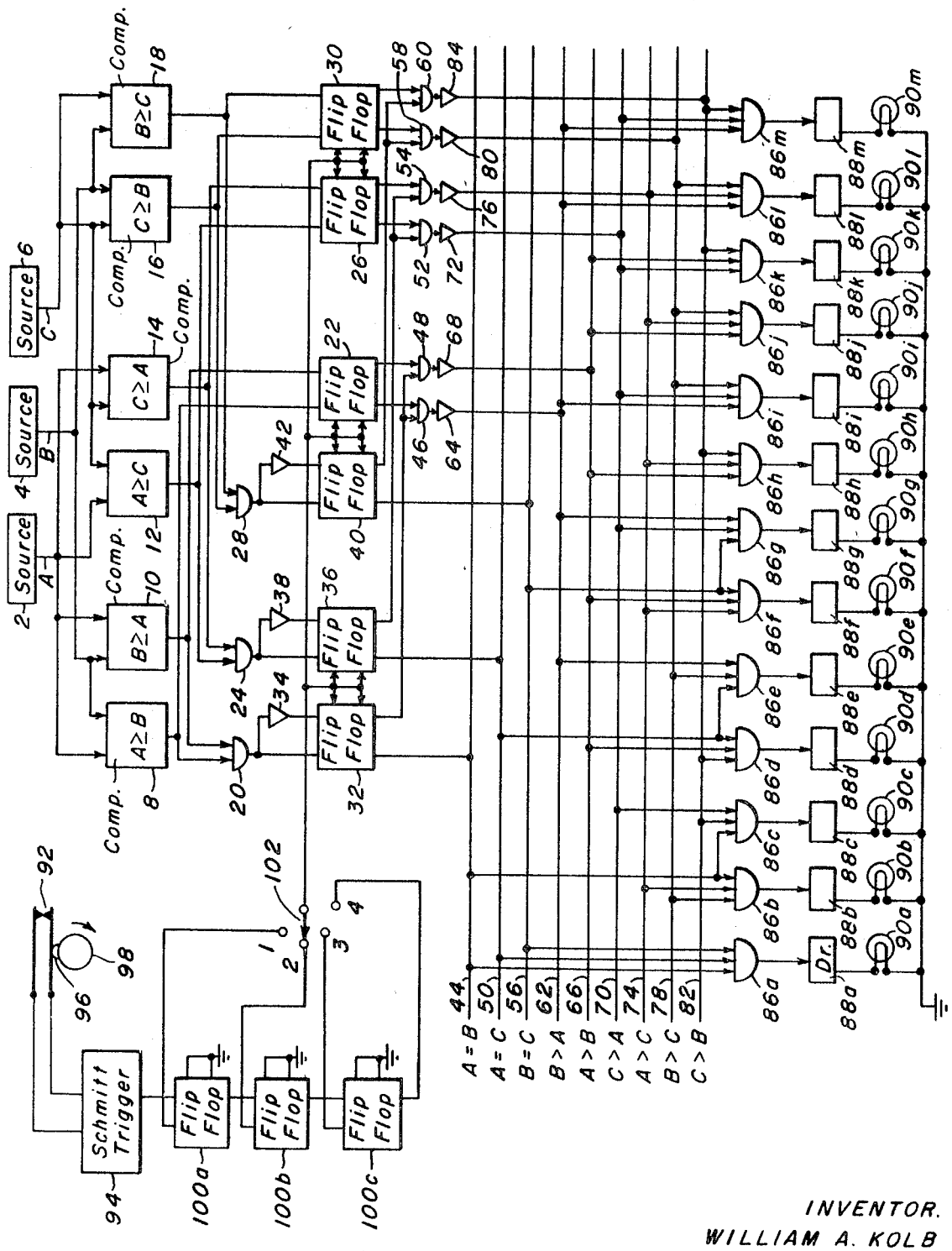

APPARATUS FOR COMPARING THE RELATIVE MAGNITUDE OF ELECTRICAL SIGNALS

This invention relates to apparatus for determining the relative magnitudes of electrical signals and more particularly to apparatus that periodically compares electrical signals and displays the relative magnitudes of the signals.

Sensors providing changing electrical signals repetitively are used to develop the flatness characteristics of steel strip during rolling. While the absolute magnitude of these signals is of some importance, the relative magnitude of the signals is considerably more important in any particular instant of time. When the repetitive rate of developing a group of electrical signals reaches a certain level, as for example 5 sensings a second, visual readouts on a relative magnitude of the signals becomes difficult.

It is, therefore, an object of my invention to provide apparatus for determining the relative magnitudes in a group of electrical signals.

Another object of my invention is to provide apparatus for periodically displaying the relative magnitude of a group of electrical signals.

These and other objects will become more apparent after referring to the following specification and drawing, in which:

The single FIGURE is a schematic drawing of my invention.

Referring now to the drawing, reference numerals 2, 4 and 6 represent sources of electrical signals A, B and C, respectively. Sources 2, 4 and 6 may each be sensors used in developing flatness characteristics of steel strip during rolling. Signals A, B and C are periodically turned on and off together. Signals A and B are connected to a comparator 8 which provides an output when signal $A \geq$ signal $B$. Comparators 10, 12, 14, 16 and 18 are connected in a similar manner to provide a set of outputs to include all the possible relationships between signals A, B and C. Comparators 8 through 18 as well as the other logic components in this circuit are standard logic circuits such as those supplied by the Digital Equipment Corporation, Maynard, Mass.

The output of comparator 8 is connected to a first input of a NAND gate 20 and a first input of a storage element such as a flip-flop 22. The output of comparator 10 is connected to a second input of gate 20 and a second input of flip-flop 22. The output of comparator 12 is connected to a first input of a NAND gate 24 and a first input of a flip-flop 26. The output of comparator 14 is connected to a second input of gate 24 and to a second input of flip-flop 26. The output of comparator 16 is connected to a first input of a NAND gate 28 and a first input of a flip-flop 30. The output of comparator 18 is connected to a second input of gate 28 and a second input of flip-flop 30.

The output of gate 20 is connected to a first input of a flip-flop 32 and to a second input of flip-flop 32 through an inverter 34. The output of gate 24 is connected to a first input of a flip-flop 36 and to a second input of flip-flop 36 through an inverter 38. The output of gate 28 is connected to a first input of a flip-flop 40 and to a second input of flip-flop 40 through an inverter 42.

A first output of flip-flop 32 is connected to a first output line 44 ($A=B$) and a second output of flip-flop 32 is connected to a first input of a NAND gate 46 and a first input of a NAND gate 48. A first output of flip-flop 36 is connected to a second output line 50 ($A=C$) and a second output of flip-flop 36 is connected to a first input of a NAND gate 52 and a first input of a NAND gate 54. A first output of flip-flop 40 is connected to a third output line 56 ($B=C$) and a second output of flip-flop 40 is connected to a first input of a NAND gate 58 and a first input of a NAND gate 60. A first output of flip-flop 22 is connected to a second input of gate 46 and a second output of flip-flop 22 is connected to a second input of gate 48. A first output of flip-flop 26 is connected to a second input of gate 52 and a second output of flip-flop 26 is connected to a second input of gate 54. A first output of flip-flop 30 is connected to a second input of gate 58 and a second output of flip-flop 30 is connected to a second input of gate 60.

The output of gate 46 is connected to a fourth output line 62 ($B>A$) through an inverter 64. The output of gate 48 is connected to a fifth output line 66 ($A>B$) through an inverter 68. The output of gate 52 is connected to a sixth output line 70 ($C>A$) through an inverter 72. The output of gate 54 is connected to a seventh output line 74 ($A>C$) through an inverter 76. The output of gate 58 is connected to an eighth output line 78 ($B>C$) through an inverter 80. The output of gate 60 is connected to a ninth output line 82 ($C>B$) through an inverter 84.

Thirteen 3-input NAND gates $86a$ through $86m$ each have three inputs connected to three different output lines in accordance with the 13 possible relative signal level combinations. The output of each NAND gate $86a$ through $86m$ is connected respectively to the input of lamp drivers $88a$ through $88m$. The outputs of lamp drivers $88a$ through $88m$ are each connected to energize lamps $90a$ through $90m$ respectively.

A set of contacts 92 which are synchronized to close each time signals A, B and C appear are connected to a Schmitt trigger 94. Contacts 92 may be actuated by a cam 96 on a timing shaft 98 associated with signal sources 2, 4 and 6. The output of Schmitt trigger 94 is connected to a flip-flops $100a$, $100b$ and $100c$ which are interconnected to form a binary counter. The outputs of flip-flops $100a$, $100b$ and $100c$ are also connected to a 4-position selector switch 102. Selector switch 102 is connected to a gate input of flip-flops 22, 26, 30, 32, 36 and 40.

In operation, it is assumed that signals A, B and C periodically appear and on each occurrence have a fixed value. Assume, for example, that signal A is equal to signal C and signal $B>$ signal A or C, or $A=C$, $B>A$ and $B>C$. Comparators 10, 12, 14 and 18 will then each have a logic 1 output. This will result in logic 1 inputs to the first input of flip-flops 26, 32 and 40 and to the second input of flip-flops 22, 26, 30 and 36. Since these flip-flops are complementary connected, the first outputs of flip-flops 22, 26, 30 and 36 will be logic 1 and the second outputs of flip-flops 26, 32 and 40 will be logic 1. This will place a logic 1 on output lines 50, 62 and 78. Since gate $86e$ is the only gate connected to just these three output lines, there will be a logic 0 output from gate $86e$. Lamp driver $88e$, in response to the logic 0 signal, then turns on lamp $90e$ which represents one of the 13 possible relations between signals A, B and C.

Each time the three signals A, B and C appear, flip-flops 22, 26, 30, 32, 36 and 40 will be given a net set of inputs and will change state accordingly, turning on the appropriate lamp until the three signals A, B and C reappear. If the duration of the three signals A, B and C is long enough, the flip-flops may be eliminated.

If the signals appear in too rapid a sequence, it may be difficult to read and interpret the signals. Contacts 92 close each time signals A, B and C appear. The resultant pulse from the Schmitt trigger 94 is passed through position 1 of selector switch 102 to flip-flops 22, 26, 30, 32, 36 and 40 to act as a gate and pass the appropriate signals through the flip-flops. If this results in too frequent a display, switch 102 is moved to position 2 where every second closing of contacts 92 will gate the flip-flops. Positions 3 and 4 result in a display for every fourth and eighth closing, respectively, of contacts 92.

While the circuit has been shown with three signals, the same components could be used where comparison is required for more or less than three signals.

I claim:

1. Apparatus for determining the relative magnitudes of electrical signals which comprises a source for each electrical signal, a pair of comparators for each possible pair of said electrical signals, the first of said comparators of each pair being connected to its associated signal sources for providing an output when the associated pair of signals are equal or when the first signal of the pair is greater than the second signal and the second of said comparators of each pair being connected to its associated signal sources for providing an output when the associated pair of signals are equal or when the second signal of the pair is greater than the first signal, a first gate for each pair of associated comparators connected to said comparators for providing an output when both comparators of the associated pair are providing outputs, and a pair of gates for each pair of associated comparators connected to said comparators and to the associated first gate for providing an output from one gate of said pair when only one of the associated comparators has an output, and from the other gate of said pair when only the other comparator has an output.

2. Apparatus according to claim 1 which includes a pair of storage elements connected to each pair of comparators, the associated first gate and the associated pair of gates for maintaining the output from the one gate from which an output exists from the time a group of signals is received by the comparators until the next succeeding group of signals is received by the comparators.

3. Apparatus according to claim 1 which includes at least three electrical signals and a set of gates interconnected to the outputs of the first gates and the outputs of the pairs of gates for providing one output from only one gate of said set of gates for each possible combination of comparator output conditions.

4. Apparatus according to claim 3 which includes a pair of storage elements connected to each pair of comparators, the associated first gate, the associated pair of gates, and the set of gates for maintaining the output from the one gate of the set of gates from which an output exists from the time a group of signals is received by the comparators until the next succeeding group of signals is received by the comparators.

5. Apparatus according to claim 4 which includes a source of electrical pulses connected to said signal source for providing a pulse each time a set of signals is received by the comparators, means connected to said pulse source for counting said pulses, selector means connected to said counting means for selecting a predetermined number of pulses, and means connected to said selector means and said storage elements and responsive to the occurrence of said predetermined number of pulses for maintaining the one output of a gate of the set of gates occurring at the predetermined count until the next predetermined count occurs.

6. Apparatus according to claim 5 which includes means connected to each gate of said set of gates for displaying the output of each of said gates.